United States Patent [19]
Hoffman et al.

[11] 3,851,968

[45] *Dec. 3, 1974

[54] METHOD FOR PHOTOGRAPHING A SET OF VARYING CONTRAST RADIOGRAPHIC X-RAYS

[76] Inventors: Stanley A. Hoffman, Hedard Hill Rd., R.D. No. 2, Randolph, Vt. 05060; David J. Paxton, 70 Park Rd., Wyomissing Hills, Reading, Pa. 19609

[*] Notice: The portion of the term of this patent subsequent to July 9, 1991, has been disclaimed.

[22] Filed: Sept. 15, 1972

[21] Appl. No.: 289,654

Related U.S. Application Data
[63] Continuation-in-part of Ser. No. 129,453, March 30, 1971.

[52] U.S. Cl. .................. 355/132, 355/28, 355/46, 355/64
[51] Int. Cl. ........................................ G03b 27/02
[58] Field of Search .......... 355/132, 27, 28, 46, 64, 355/78; 250/65 R

[56] References Cited
UNITED STATES PATENTS
3,115,058  12/1963  Wally ............................. 355/65 X
3,289,530  12/1966  Samain ........................... 355/46 X
3,492,486  1/1970  Bischoff et al. ............... 250/96 R X Primary Examiner—Richard L. Moses
Attorney, Agent, or Firm—Maleson, Kimmelman & Ratner

[57] ABSTRACT

A method for photographing a set of varying contrast radiographic x-rays for mounting within openings of an aperture card or within a transparent jacket. A set of radiographic x-rays are photographed alone or in combination with a substantially opaque report describing the x-ray set. Photography is accomplished through use of a single exposure setting of a standard microfilm camera. The film is processed through a succession of developing, fixation and water baths to provide a film negative transparency. The negative may be cut and mounted on the aperture card or inserted in the transparent jacket. A positive transparency may be formed by passing the negative through a contact printer and then processing the resulting positive film through a series of developing, fixation and water baths. The positive transparency is then cut to proper size and mounted on the aperture card.

30 Claims, 2 Drawing Figures

METHOD FOR PHOTOGRAPHING A SET OF VARYING CONTRAST RADIOGRAPHIC X-RAYS

This patent application is a continuation-in-part of patent application Ser. No. 129,453 filed Mar. 30, 1971.

BACKGROUND OF THE INVENTION

A. Field of the Invention

This invention relates to the field of photographing radiographic x-rays. In particular, this invention pertains to the field of methods in photographing sets of varying contrast radiographic x-rays alone or in combination with description reports and mounting such in aperture cards or transparent jackets.

B. Prior Art

Radiographic x-rays are used in great quantity in the day to day operation of hospitals and radiology departments. X-rays of this type are usually of large size, bulky, and combined with the vast number needed, provide an increasing problem in filing and ability to retrieve necessary data. While microfilming radiographic x-rays has become well known, previous methods permit only one x-ray per frame of microfilm. The reason for this is that different x-ray images have different contrasts and known methods of microfilming could not accept more than one x-ray of varying contrast per frame. Thus, although prior systems of microfilming x-rays do increase the amount of x-rays that may be stored, the number of x-rays that may be mounted on a viewing (aperture) card is limited to the number of frames that fit within an aperture of the card.

When previous microfilming system include only one x-ray per frame, all of one person's x-rays that are taken do not fit on a single viewing card for instant comparisons. The many cards required for each person's x-ray produces awesome problems in storing and retrieving the necessary x-ray data.

SUMMARY OF THE INVENTION

A method of photographing a set of radiographic x-rays with at least one of the x-rays having varying contrast with respect to the other x-rays to be viewed on one frame of photographic film inserted into an aperture card. The method includes the step of microfilming the set of radiographic x-rays at a predetermined single exposure setting to produce a radiographic x-ray microfilm. The microfilming includes photographing the set of radiographic x-rays in a predetermined reduced contour dimension on a photographic film for producing a set of radiographic x-ray images exposed thereon. After microfilming, the x-ray microfilms are positioned on the aperture card or within a transparent jacket.

DESCRIPTION OF THE PREFERRED EMBODIMENT

Figure 1:
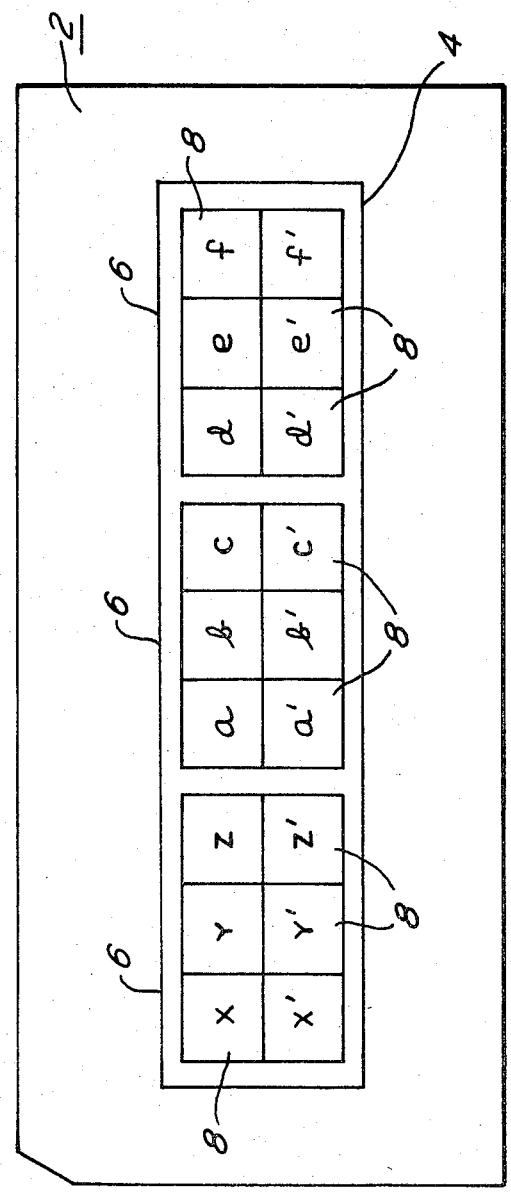
FIG. 1 is a front view of an aperture card having mounted therein a set of radiographic x-ray images; and, FIG. 2 is a block diagram presented in consecutive flow form showing the method of photographing a set of varying contrast radiographic x-rays.
Figure 2:
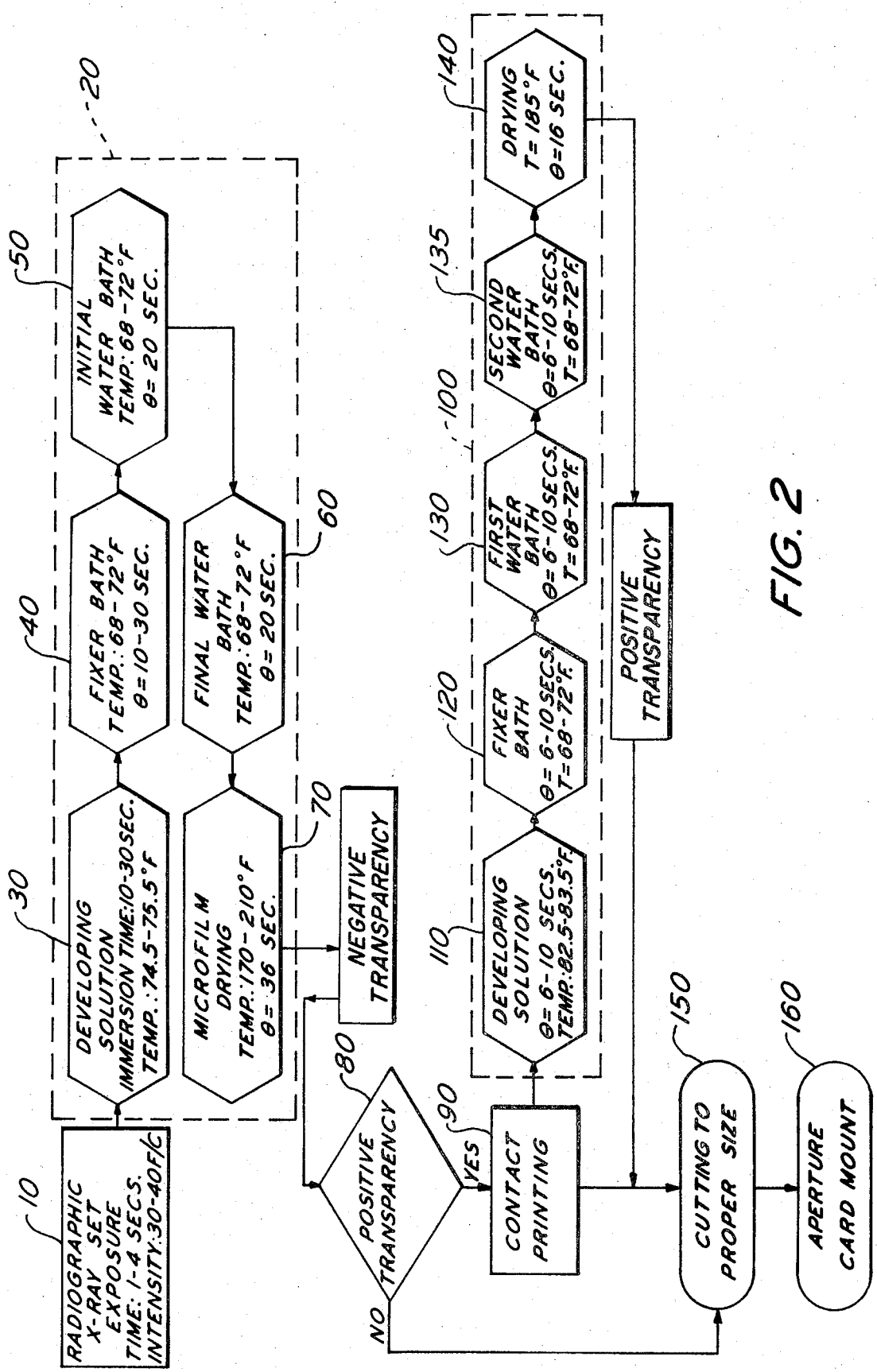

Referring now to FIG. 1, there is shown aperture card 2 having aperture 4 within which a plurality of microfilm frames 6 are mounted. Each frame 6 includes a set of radiographic x-rays 8 having varying contrast. Using the method invention as herein described, it has been generally found that six 14 × 17 inch x-ray images 8 of varying contrast may be photographed on a single frame 6. FIG. 2 now shows a system or flow block diagram describing the consecutive method events associated with the photographing of a set of radiographic x-rays with at least one of the x-rays having varying contrast with respect to the others. In accordance with the method as will be described in the following paragraphs, a multiplicity of x-ray images 8 may be mounted on aperture card 2 and viewed.

Prior to the important method step of microfilming, the radiologist or other user is presented with a set of varying contrast x-rays. The varying contrast of the x-rays is found due to the fact that the x-rays were taken of different parts of the body, the x-rays were taken under individual lighting conditions, the x-rays were taken with different machines, as well as a number of other reasons. The user takes the varying contrast and varying sized radiographic x-rays and initially sorts the set into a subset in some predetermined order for photographing. The sorted subset is a function of the need of the user, and not as a function of the photographic properties of the set of radiographic x-rays.

During the photographing of a cluster or subset of x-rays for viewing on one frame 6 of film, a problem area of consideration included the constraint of having to choose the subset of x-rays to be filmed having approximately the same contrast. This fact may prevent the photographing of x-rays in a particular order needed for comparison purposes by the radiologist or other user.

As mentioned, the sorting step includes taking the radiographic x-ray set and radiologically sequencing the x-ray set into an x-ray subset without regard as to the contrast qualities of each radiographic x-ray. Each of the x-ray subsets have a predetermined number of radiographic x-rays contained therein. The ordered or sequenced x-ray subset to be photographed on one frame 6 of film is usually used for comparison purposes. The comparison need is determined by chronology of an x-rayed area, with respect to body portions or in some like manner as deemed appropriate by the radiologist or other user.

The particularly ordered subset of x-ray radiographs are then mounted on a transparent table for photographing the entire x-ray subset at one exposure setting. Generally in this manner, a predetermined ordering of the varying contrast and possible different sized x-rays are prepared for microfilming on a particular frame 6 to be mounted in aperture card 2.

The next step in the method is in microfilming the set of radiographic x-rays within a predetermined single exposure setting range to produce a radiographic x-ray microfilm or negative transparency as characterized by system blocks 10-70 of FIG. 2. The radiographic x-ray set exposure or photography as established in block 10 is accomplished through incorporation of a standard microfilm camera to produce a set of negative image transparencies on a photographic film to be described more fully in the following paragraphs.

In the preferred embodiment of the invention, an Itek microfilm camera, Model No. 3536 has been successfully used to produce the necessary negative image transparencies. In operation, the x-ray set to be photographed is mounted on the microfilm camera. The camera model described permits the microfilm to be held securely in the exposure plane through use of a movable suction plate. The securement and control of the microfilm in a precise exposure plane through the vacuum suction plates optimizes the resolution during the exposure and minimizes the possibility of the film abrasions when and if the film is to be advanced.

Proper illumination during the initial step is an important parameter in determining the success of photographing the x-ray set under consideration. The Itek microfilm camera described includes facilities for both backlighting and top lighting. The Itek microfilm camera was provided by the manufacturer with a plurality of green fluorescent backlighting tubes which were changed to provide a white backlight. The backlighting is preferably white light and is diffused having a plurality of intensity settings actuated by a single control, well known in the art, in order to permit settings ranging from a low to a high intensity. The top lighting is colored green and is also continuously variable in intensity from a high to a low value. Adjustable slides may be used for balancing the illumination over a copyboard on which the radiographic set of x-rays are mounted.

Where each x-ray to be studied includes a written or typed report, it may be advantageous to photograph the report in combination with the x-ray set on a single exposure. In doing this, a spot type light may be mounted on the camera head to provide a beam of reflected light to impinge on the camera table where the x-ray set and report is mounted. The x-ray set and report are placed on the transparent camera table where transmitted light passes through the x-ray set. A piece of opaque material cut to the approximate dimensions of the report is placed on the camera table. The report is aligned with and placed over the opaque material. Therefore, transmitted light passing through the camera table passes through the x-ray set but is blocked by the opaque material. The spot light is positioned onto the report to be photographed. The spot light is balanced in light intensity to that of the light being transmitted through the camera table. This procedure permits photographing with both transmitted and reflected light in combination, with effectively no substantial scatter effect.

The photographing step of block 10 incorporates the basic parameters of exposure time, transmitted light intensity, reflected light intensity, and film type as a function of the microfilm camera type being used. Utilization of Itek Model No. 3536 camera in producing negative transparencies for x-ray sets having varying contrast has resulted in an empiracally derived exposure time range approximately 1.0 to 4.0 seconds with an optimized exposure time setting approximately 1.5 seconds. The workable transmitted light intensity during this step has been found within the range between 30 to 40 foot-candles (fc) with an optimized exposure transmitted light intensity approximately 35 foot-candles. Although a number of high contrast films have been established to be useful in this step of the method, the photographic film used in the optimized version of this step was Kodak SO281 radiographic film which is commercially available.

The reduction photographing to a predetermined contour dimension is a function of the needs for a specific operation. The camera model herein described includes an automatic reduction selector and may be adjusted to give reductions between 16 and 36 power. In the standard size aperture card and frame mounting area 4, it has been found useful in this method to reduce the set of x-rays by 27 power.

In summary, the photographing step in forming an acceptable microfilm includes optimizing the x-ray images 8 as a negative transparency on the photographic film. The microfilm camera described may be an Itek Model No. 3536 or some like apparatus having a preferred light intensity capability of 35 foot-candles (fc) and an exposure time approximating 1.5 seconds. Kodak SO281 radiographic low contrast photographic film has been used in combination with the other basic parameters to achieve the desired results. Although not relating to the basic inventive concept as herein described, a reduction ratio in the order of 27 power has resulted in adequate resolution when viewing the set of x-rays 8 mounted in opening 4 of aperture card 2.

After photographing the set of radiographic x-rays, the film is processed to yield a reversal or negative transparency. The overall processing step is shown in FIG. 2 as the dotted block 20 encompassing individual blocks 30 through 60. As a first step in processing, the photographic film is taken from the microfilm camera and immersed in a high contrast developing solution as characterized by block 30. During this stage of processing, the latent image on the photographic film is transferred into a visible image. This conversion is accomplished by selective reduction into metallic silver of the crystals which are included in the emulsion which forms the latent image. Developing agents are those substances which selectively reduce the included crystals into metallic silver. The step shown in block 30 uses an Itek 21-41 developer solution which is commercially available. However, the solution temperature has been found critical in the forming of an optimized visible image. The acceptable temperature range is between 72°F and 78°F, with an optimized temperature range between 74.5°F and 75.5°F and a preferred solution temperature maintained substantially at 75°F. It has been found that immersion time within the solution may be varied between 10.0 and 30.0 seconds with a preferred immersion time approximating 20.0 seconds giving optimized results. The criticality of the acceptable temperature range for the developing solution is emphasized by the fact that the recommended solution temperature is generally recognized to be 68°–70°F, the necessary temperature in the subject process being well out of the suggested range.

After passing through the developing solution of block 30, the photographic film is brought to the fixer bath block 40. The film is placed in the fixing solution where the silver salts are removed from the film. This is an essential step in processing since the salts if allowed to remain in the film would turn the negative black upon exposure to any light source. Fixing agents used in the subject invention include sodium and ammonium thiosulfate; however, other agents may possible be used such as lithium, guadine thiosulfate, potassium cyanide, thioura, potassium and ammonium thiocynate.

Where the fraction of silver halide dissolved is plotted against a time variable, it appears to form an elongated S-curve having a linear gradient in the midportion. Where earlier stages in this step are disregarded, it is seen that the amount of silver halide dissolved in substantially linearly proportional to the amount remaining in the film. For this, it has been found that the amount of halide dissolved may be written in the differential form:

$$dH/d\theta = K(a-H) \qquad (1)$$

where
  $H$ = Halide dissolved as a function of time
  $\theta$ = time
  $K$ = Rate Factor
  $a$ = Initial concentration of halide Solution of equation (1) yields the amount of halide dissolved in any time to be;

$$H = e^{-K\theta} + a \qquad (2)$$

In the subject method invention, utilizing the film herein described, it has been found that maintaining the film in the fixer bath within the range of 68° to 72°F with a preferred temperature of 70°F for between 10 and 30 seconds with a preferred time of 20 seconds has removed a sufficient amount of halide salts to accomplish the desired results.

The next consecutive step within processing dotted block 20 is bathing the film in an initial water bath solution as shown in block 50. Immersion of the film in the water solution is maintained for approximately 20 seconds plus or minus one second. The bath is maintained at a constant temperature within the range of 68°F to 72°F with an optimized bath temperature approximating 70°F.

After completion of the initial water bath step shown in block 50, the film passes to a final water bath as shown in block 60. The water bath is maintained at a constant temperature within the range of 68°–72°F with a preferred temperature being 70°F. The time spent within the final water bath ranges between 10 and 30 seconds with an optimized time approximating 20 seconds, similar to that for the initial water bath of block 50. Additionally, Kodak solution Photoflo which is commercially available is added to the final water bath 60 to form a solution which lowers the surface tension of the wash water. Further, the water which is in final water bath 60 is circulated continually through a tank defining the bath at a rate approximately 1.5 gallons per minute. The circulating water permits a fresh supply of water to pass over consecutive film elements.

This final washing step removes any of the soluble silver thiosulfate compounds, possible hypo or other substances which may have been present in the fixing bath of block 40. The importance of equations (1) and (2) is shown in the fact that if fixing is incomplete, no amount of final washing will make the image a permanent one since insoluble silver thiosulfate complexes will discolor as a function of time. Where there is insufficient final washing in block 60, hypo will eventually form in combination with the silver that is present. This combination will result in a brownish yellow silver halide.

Once the microfilm has passed through the final water bath as expressed by block 60, the resulting microfilm is then dried as shown in block 70. The object of this step in the general processing procedure of block 20 is to bring the gelatin layer of the film to the point where it is in equilibrium with the relative humidity of the ambient environment where the negative transparency is to be handled and stored. In the drying step, air is raised to a temperature within the range of 170° to 210° F having a preferred temperature of approximately 200°F. The microfilm is maintained in this heated air flow for a time range between 34 – 38 seconds with a preferred maintenance time substantially equal to 36 seconds. Heating the air lowers the relative humidity and increases the amount of water which the air may absorb, thus speeding the drying step. However, where the relative humidity of the heated air is too low, the surface of the emulsion layer may dry faster than the interior thus setting up stress loads in the gelatin layer. Such stress loads have the deleterious effect of increasing the graininess of the image. The drying step block 70 may include a variety of known drying apparatus including use of a drying cabinet in combination with electrical heating units, baffles and fans to distribute the heated air evenly throughout the cabinet. Other such apparatus, not important to the inventive concept, may further include infrared lamps or other such means for elevating the temperature of the drying air.

Upon completion of the drying step shown in block 70, the initial processing procedure of block 20 has been accomplished. At this stage of the method, a microfilm negative or negative transparency of the original set of radiographic x-rays have been formed. At this point, it is decided whether a positive transparency is to be made before cutting the film to proper size in block 150 and final mounting of the film on an aperture card in block 160. The decision of whether to form a positive transparency before positioning of the film on the aperture card in blocks 150, 160 is a function of the operator's use and custom. In the United States, it is generally accepted that a positive transparency be made; however, in some foreign countries, this method is not followed.

Assuming a decision for making a positive transparency is made as shown in block 80, the negative transparency is passed into a standard contact printer. A contact print is made in block 90 by exposing a strip of unexposed film to the negative transparency of the microfilm. The two films are in direct contact with each other with the emulsion surface of one contiguous with the emulsion surface of the other. In this manner, a positive transparency print is formulated in block 90.

In the subject invention, an Itek Model 303 contact film printer is used for contact printing between the aforementioned films. During the contact printing step, the printing slot is maintained at substantially 0.15 inch opening width with a film passage speed between 30 and 55 feet per minute. Light intensity is maintained at or near 30,000 foot-candles by using a high intensity quartz-iodine lamp, easily installed in the commercially available contact printer herein described.

The Itek Model No. 303 contact printer reproduces with extremely high resolution. In order to accomplish this, the film drive utilizes a constant tension take-up on the positive and negative spindles independent of the length of film being reproduced. Film used to form the positive transparency print may be anyone of a number of commercially sold brands; however, Kodak 5464 slow, medium contrast 35 mm. film has been successfully used in producing a highly acceptable image transfer needed for this method.

Having passed through the contact printing step of block 90, the positive transparency enters processing step block 100. The internal steps for processing include developing block 110, fixation bath block 120, first water bath block 130, second water bath block 135 and finally drying within block 140. Blocks 110, 120, 130 and 135 include steps wherein a standard processor may be used such as Itek Model No. 335 Transflo Film Processor. In this processor, the positive transparency film is buoyantly passed through each bath or processing station. Solutions are applied to opposing film surfaces simultaneously which allows film processing whether the film emulsion is face up or face down.

As a first step in the processing of the positive transparency print, the film is taken from the contact printer and immersed in a high contrast developing solution as represented by internal block 110. The developing solution during this step is Itek 21–41 developer solution identical to that used in block 30. In this step, however, the developing solution is maintained at a predetermined temperature within the range between 82.5° and 83.5°F, with a preferred temperature approximating 83°F. The film incorporation time is between 6 and 10 seconds with a preferred optimized time of 8 seconds.

The film then passes to a fixer bath shown in block 120. The bath is a commercially available solution commonly known as Itek Fixer Solution 57517. The film is maintained in the fixer bath for a predetermined time within the range approximating 6-10 seconds with a preferred time of 8 seconds. The bath is maintained at a specific temperature within the range between 68°-72°F, with a preferred temperature maintenance approximating 70°F.

A first water bath washes the positive transparency as shown in block 130. This step has the function of removing any of the unwanted compounds which may have been present in the fixing bath of block 120. The first water bath is maintained at a predetermined temperature within the range of 68°-72°F with a preferred temperature of 70°F. The film remains immersed for a time duration between 6 and 10 seconds, preferably for approximately 8 seconds.

The film is then passed into a second water bath solution block 135 where the temperature is once again maintained within the range 68°-72°F with a preferred temperature of 70°F. The immersion time is once again preferably 8 seconds, but an acceptable time range encompasses 6-10 seconds. As was the case in system block 60, Kodak solution Photoflo is added to the second water bath block 135 in order to lower the surface tension of the wash water. Water passing through the tank of the water bath has a rate approximating 1.5 gallons per minute.

The film passes to drying block 140, similar in nature to that of block 70. However, in block 140, the positive transparency print is dried in air at a temperature approximating 185°F. The time the film remains in the heated air flow approximates 16 seconds. Having passed through blocks 90-140 consecutively, the positive transparency print has been processed and is completed and ready for positioning within openings 4 of aperture card 2.

After processing the film, whether at the completion of processing blocks 20 or 100, a plurality of 35 mm. frames 6 containing images of more than one x-ray 8 per frame, are placed in aperture card 2. These steps are represented by blocks 150 and 170 where the film is cut to size to fit predetermined contour openings 4 in aperture card 2. Mounting of the film may be accomplished through adhesive or some like means to allow ease of viewing.

In the manner described, using a 27 power reduction of an original set of radiographic x-rays having varying contrast, six 14 × 17 inch x-ray images 8 are photographed on a single frame 6. The 14 × 17 inch x-ray size is the maximum standard medical dimension and the present invention permits at least 18 x-ray images 8 to be mounted on a single aperture card 2. The aperture card 2 in itself may be used in a variety of sizes, however, the most common size is the standard IBM card having an outer contour dimension substantially equal to 7.34 × 3.25 inches. Generally speaking, the aperture or opening 4 within card 2 is of sufficient dimension to allow at least three frames 6 of 35 mm. film to be positioned therein. In most instances, the rectangular aperture dimensions approximate 1 × 6 inches in order to provide adequate mounting space on card 2 while permitting record files or other pertinent data to be imprinted thereon.

In addition to the mounting of the aforementioned film in an aperture card as herein described, the film may be inserted loosely within a two channel tab size jacket of size sufficient for the mounting of a standard 35 mm. film. The jacket comprises an optically clear envelope of plastic sheet having open ends for receiving the film. The sheet plastic is longitudinally bonded together to form two individual compartments for the mounting process.

It is believed that in order to explain how a grouping of radiographic X-rays having varying contrast can be backlighted with a single source of light having a substantially uniform brightness and be photographed simultaneously with a single exposure setting it is necessary to refer to the characteristic curve of the negative emulsion.

Such characteristic curves are well known in the art and are obtained by exposing the photographic material to a density scale, measuring the resultant densities produced in the photographic material, and plotting one against the other. This has been found to be a common way of depicting the sensitivity of the photographic materials and is generally provided by film manufacturers for use of their products. Characteristic curves are generally segregated into three separate regions; the toe, the straight line portion and the shoulder. When photographing a scene, it is desirable to adjust the exposure so that the range of illuminations reaching the film are within the straight line portion of the characteristic curve. It is generally known that if the exposure is extended to the toe, small differences in illumination may not produce differences in density in the negative which would be great enough to be visible, thus detail may be lost in the shadow portions of the scene. Similarly, detail may be lost in the lightest areas if the light levels reaching the film were allowed to extend to the shoulder of the curve.

When copying a photograph X-ray, it is common practice to adjust the exposure to the middle of the linear or straight line region of the curve so that photos which have a high overall density can be made lighter in the copying, or that "light" photos can be made denser. This is done usually to produce a more attractive picture that is neither too dark nor too light. However, this readjustment in total overall density can in no way bring out details that were not present in the original and may in fact result in loss of detail. In such cases, an original that might be "objectionably" light will often contain some detail in a dense area and this detail will be lost if the copy is made denser overall by adjustment of the exposure. In a similar way, detail can be lost in the light regions of an original which esthetically may be deemed too dense.

This overall shifting of the density of a photograph during copying cannot be justified in an application such as the faithful copying of X-rays. It is believed that the process herein described strives to reproduce in the copy the densities present in the original. Thus, X-rays which are light in the original remain light in the microfilm copy, but no detail is lost due to the fact that the densities present in the original, even though light, are still within the straight line portion of the characteristic curve. Similarly, dense X-rays will remain dense in the microfilm copy, but will have the same detail as the original.

Thus, if light or dense X-rays can be copied individually in such a way that their original densities are reproduced in the microfilm copy with no loss in detail due to shifting a portion of the original onto the toe or shoulder regions of the characteristic curve, the problem of simultaneously photographing several such X-rays with a single exposure and with the same lighting is negated.

In order to insure that the processing takes place entirely within the straight line portion of the characteristic curve so that no detail is lost, it is believed that the process as herein described adjusts the development time for an optimum slope of the straight line section of the characteristic curve to a value of less than unity. This may be necessary due to the fact that the total range of densities present in the X-rays is slightly greater than the range of densities obtainable within the microfilm. Having a slope less than unity dictates that the densities on the X-rays will not be exactly duplicated on the microfilm and that there would be a slight compression of the densities.

What is claimed is:

1. A method of microfilming a set of radiographic x-rays with at least one of said x-rays having a varying contrast with respect to others of said x-rays, to be viewed on a single frame of microfilm inserted into an aperture card, comprising the steps of:
   a. photographing said set of radiographic x-rays on said single frame of microfilm at a predetermined single exposure setting in a predetermined reduced contour dimension, said photographing to include transmitting light through said set of radiographic x-rays, said light having a non-uniform intensity subsequent to being transmitted through said set of radiographic x-rays;
   b. developing said microfilm in accordance with said single exposure setting for adjusting a characteristic curve of said film to obtain a predetermined density range of said set of x-rays; and,
   c. positioning said single frame on said aperture card.

2. The method as recited in claim 1 including the step of developing said microfilm in a predetermined time interval.

3. The method as recited in claim 1 where said film characteristic curve includes a straight line portion having a gradient less than unity.

4. The method as recited in claim 1 where the step of developing includes the step of establishing a development time interval between 10.0 and 30.0 seconds.

5. The method as recited in claim 1 where said microfilm is Kodak SO281 radiographic film.

6. The method as recited in claim 1 wherein the step of photographing said set of radiographic x-rays includes the steps of
   a. mounting a set of said varying contrast x-rays on a substantially transparent table surface within the field of view of a camera positioned on a first side of said table surface, said camera being adapted to photograph said set of x-rays; and,
   b. transmitting light through said table surface and said x-ray set, said light being positioned on a second side of said surface opposing said first side.

7. The method as recited in claim 6 including the step of photographing a substantially opaque member in combination with said x-ray set on said single exposure setting for said microfilm.

8. The method as recited in claim 7 where the step of photographing said substantially opaque member includes the steps of:
   a. positioning said opaque member adjacent said x-ray set on said table surface and within said field of view of said camera; and,
   b. directing light onto said opaque member, said directed light having a source on said first side of said table surface.

9. The method as recited in claim 8 where the step of directing light onto said opaque member is followed by the step of balancing said transmitted and said directed light intensities for minimizing light scatter effects.

10. The method as recited in claim 9 including the step of blocking said substantially opaque member from impingement by said transmitted light.

11. The method as recited in claim 1 wherein the step of photographing said set of radiographic x-rays includes the steps of:
    a. transmitting light through said x-ray set having a predetermined intensity substantially within the range between 30–40 foot-candles; and,
    b. exposing said microfilm to said transmitting light for a predetermined length of time substantially within the range between 1.0–4.0 seconds.

12. The method as recited in claim 11 where the step of transmitting light through said x-ray set includes the step of substantially maintaining said light intensity at 35 foot-candles prior to transmission of said light through said x-ray set.

13. The method as recited in claim 12, where the step of exposing said microfilm includes the step of setting the exposure time for substantially 1.5 seconds.

14. The method as recited in claim 1 where the step of developing includes the step of:
    processing said developed microfilm for producing a reversal of said photographing film, said processing to include as a first step immersing said film within a high contrast developing solution, said developing solution being maintained at a predetermined temperature within the range 72°–78°F.

15. The method as recited in claim 14 where the step of immersing said microfilm includes the step holding said microfilm in contact with said developing solution for a predetermined time within the range between 10.0–30.0 seconds.

16. The method as recited in claim 15 where the step of immersing said microfilm includes the step of maintaining said developing solution at a temperature substantially equal to 75°F.

17. The method as recited in claim 14 where the step of processing said microfilm after immersing said microfilm in said developing solution includes the steps of:
   a. placing said microfilm in a fixer bath having a predetermined temperature;
   b. bathing said microfilm in an initial water solution maintained substantially at a temperature approximating 70°F;
   c. introducing said microfilm into a final water bath solution maintained at a temperature substantially equal to said initial water solution bath; and,
   d. drying said film at a predetermined temperature within the range between 170°–210°F.

18. The method as recited in claim 17 where the step of placing said microfilm in a fixer bath includes the step of maintaining said fixer bath temperature within a range approximating 68°–72°F.

19. The method as recited in claim 18 where the step of placing said microfilm in said fixer bath includes the step of immersing said microfilm in said fixer bath for a time substantially equal to 20 seconds.

20. The method as recited in claim 1 where the step of positioning includes the steps of:
   a. cutting said x-ray microfilm to a predetermined contour outline; and,
   b. mounting said x-ray microfilm in an opening of said aperture card for viewing, said opening a contour outline substantially equal to said cut microfilm.

21. A method of producing on one frame of microfilm, a plurality of radiographic x-rays images adapted for viewing in an aperture card, comprising the steps of:
   a. photographing a set of said radiographic x-rays on said frame of said microfilm at a predetermined single exposure setting in a predetermined reduced contour dimension, said photographing to include transmitting light through said set of radiographic x-rays, said light having a non-uniform intensity subsequent to being transmitted through said set of radiographic x-rays;
   b. developing said microfilm in accordance with said single exposure setting for adjusting a characteristic curve of said film to obtain a perdetermined density range of said set of x-rays;
   c. contact printing said developed x-ray microfilm to produce a positive transparency print of said microfilm;
   d. locating said positive transparency of a set of x-rays within a predetermined contour opening of said aperture card.

22. The method as recited in claim 21 where the step of contact printing includes the steps of:
   a. mating an unexposed developed microfilm strip to said microfilm;
   b. traversing said mated microfilm strips through a contact printer at a predetermined film speed within the approximate range between 30–55 feet per minute; and,
   c. transmitting light through said mated microfilm strips within said contact printer, said light having an intensity approximating 30,000 foot-candles, said unexposed microfilm forming a positive transparency print of said developed microfilm.

23. The method as recited in claim 22 where the step of contact printing is followed by the step of:
   immersing said print within a high contrast developing solution, said developing solution being maintained at a predetermined temperature within the range approximating 82.5°–83.5°F.

24. The method as recited in claim 23 where the step of immersing said print includes the step of holding said print in contact with said developing solution for a predetermined time within the range approximating 6.0–10.0 seconds.

25. The method as recited in claim 21 where the step of producing a positive transparency of said microfilm x-ray microfilm includes the steps of:
   a. immersing said positive transparency print of said developed microfilm within a consecutive series of baths, each of said baths maintained at a predetermined temperature aproximating the range 68°–72°F, said immersion for a time substantially equal to 8 seconds; and,
   b. drying said positive transparency print at a temperature substantially equal to 185°F.

26. The method as recited in claim 25 where the step of immersing said positive transparency print includes the steps of:
   a. bathing said positive transparency print in a fixer solution;
   b. placing said positive transparency print into a first water bath; and,
   c. incorporating said positive transparency print into a second water bath.

27. The method as recited in claim 21 where the step of locating said positive transparency includes the steps of:
   a. cutting said positive transparency to a predetermined outline; and,
   b. mounting said positive transparency within said opening of said aperture card for viewing.

28. The method as recited in claim 21 wherein the step of photographing is preceded by the step of sorting said radiographic x-rays in a predetermined order.

29. The method as recited in claim 28 where the stop of sorting said x-ray set includes the step of radiologically sequencing said x-ray set into an x-ray subset having a predetermined number of radiographic x-rays therein for producing said predetermined number of x-ray images exposed on said single frame of said microfilm.

30. The method as recited in claim 29 where the step of radiological sequencing is followed by the step of mounting said predetermined number of radiographic x-rays on a substantially transparent surface for photographing said radiographic x-rays.

* * * * *